US007889192B2

(12) United States Patent
Konya et al.

(10) Patent No.: US 7,889,192 B2
(45) Date of Patent: Feb. 15, 2011

(54) MOBILE EQUIPMENT WITH THREE DIMENSIONAL DISPLAY FUNCTION

(75) Inventors: Minehiro Konya, Daito (JP); Yusuke Miyata, Higashihiroshima (JP); Kei Okuda, Higashihiroshima (JP); Takashi Yasumoto, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1515 days.

(21) Appl. No.: 10/611,871

(22) Filed: Jul. 3, 2003

(65) Prior Publication Data

US 2004/0004616 A1 Jan. 8, 2004

(30) Foreign Application Priority Data

Jul. 3, 2002 (JP) .............................. 2002-194285

(51) Int. Cl.
*G06T 15/00* (2006.01)
(52) U.S. Cl. ..................................................... 345/419
(58) Field of Classification Search ................. 345/419, 345/418, 629; 382/154; 715/706; 348/42, 348/49
See application file for complete search history.

(56) References Cited

U.S. PATENT DOCUMENTS

| 4,929,971 | A | * | 5/1990 | Imura et al. ................. 396/311 |
| 5,682,171 | A | * | 10/1997 | Yokoi .............................. 345/7 |
| 5,818,463 | A | * | 10/1998 | Tao et al. ..................... 345/473 |
| 6,097,854 | A | * | 8/2000 | Szeliski et al. ............... 382/284 |
| 6,464,358 | B1 | * | 10/2002 | Shirakura et al. ............... 353/7 |
| 6,940,646 | B2 | * | 9/2005 | Taniguchi et al. ........... 359/463 |
| 6,995,762 | B1 | * | 2/2006 | Pavlidis et al. .............. 345/419 |
| 2002/0054032 | A1 | * | 5/2002 | Aoki et al. ................... 345/204 |
| 2003/0164819 | A1 | * | 9/2003 | Waibel ......................... 345/173 |

FOREIGN PATENT DOCUMENTS

| EP | 0 540 137 A1 | 4/1992 |
| EP | 1 098 498 A | 5/2001 |
| JP | 5-7373 A | 1/1993 |
| JP | 07-182533 A | 7/1995 |
| JP | 7-235892 A | 9/1995 |
| JP | 9-074573 | 3/1997 |
| JP | 9-185321 A | 7/1997 |
| JP | 10-075432 A | 3/1998 |
| JP | 10-108152 A | 4/1998 |
| JP | 10-222093 A | 8/1998 |
| JP | 11-008862 A | 1/1999 |
| JP | 11-30952 A | 2/1999 |
| JP | 11-133234 A | 5/1999 |

(Continued)

OTHER PUBLICATIONS

English Translation of Japanese Patent Application 2002-077944, Inventor: Ono Shuji, Applicant: Fuji Photo Film Co Ltd., Pub-Mar. 15, 2002.*

*Primary Examiner*—Daniel F Hajnik
(74) *Attorney, Agent, or Firm*—Birch Stewart Kolasch & Birch, LLP

(57) ABSTRACT

The present invention provides a mobile phone that includes a single camera for picking up a 2D image and provides the 2D image with parallax information to create a 3D image. The 3D image is displayed on a display unit.

23 Claims, 8 Drawing Sheets

FOREIGN PATENT DOCUMENTS

| | | |
|---|---|---|
| JP | 11-167338 A | 6/1999 |
| JP | 2000-78611 A | 3/2000 |
| JP | 2001-109907 A | 4/2001 |
| JP | 2001-117522 A | 4/2001 |
| JP | 2001-251403 A | 9/2001 |
| JP | 2001-308997 A | 11/2001 |
| JP | 2002-77944 A | 3/2002 |
| JP | 2002-84552 A | 3/2002 |
| JP | 2002-123842 A | 4/2002 |
| WO | WO 00/00934 A | 1/2000 |

\* cited by examiner

FIG.7A
701
FIG.7B
3D DISPLAY
2D DISPLAY
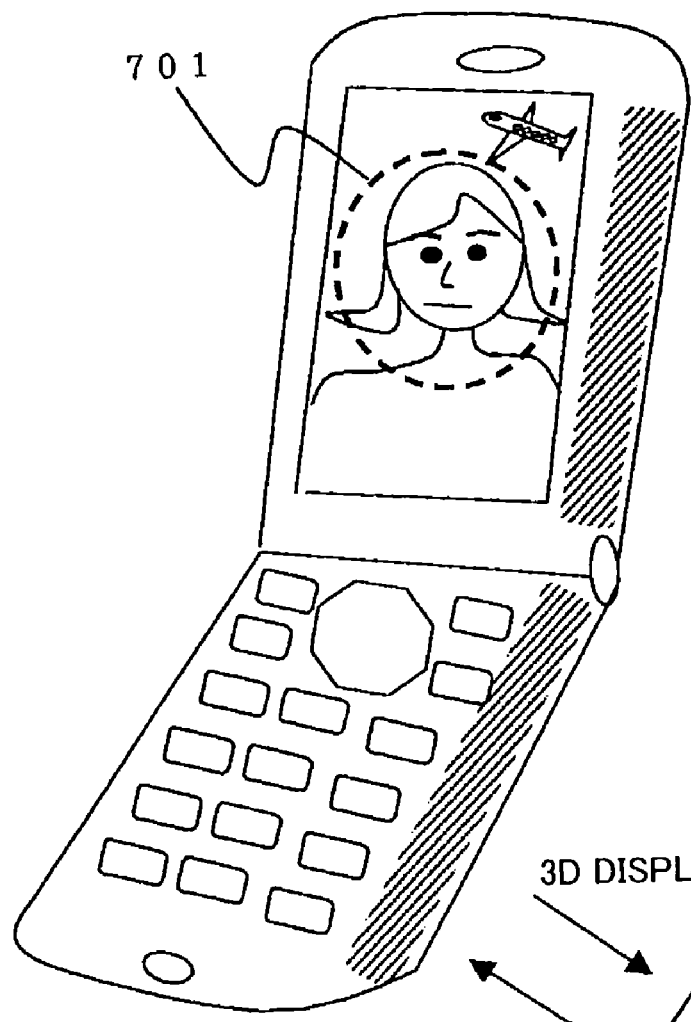
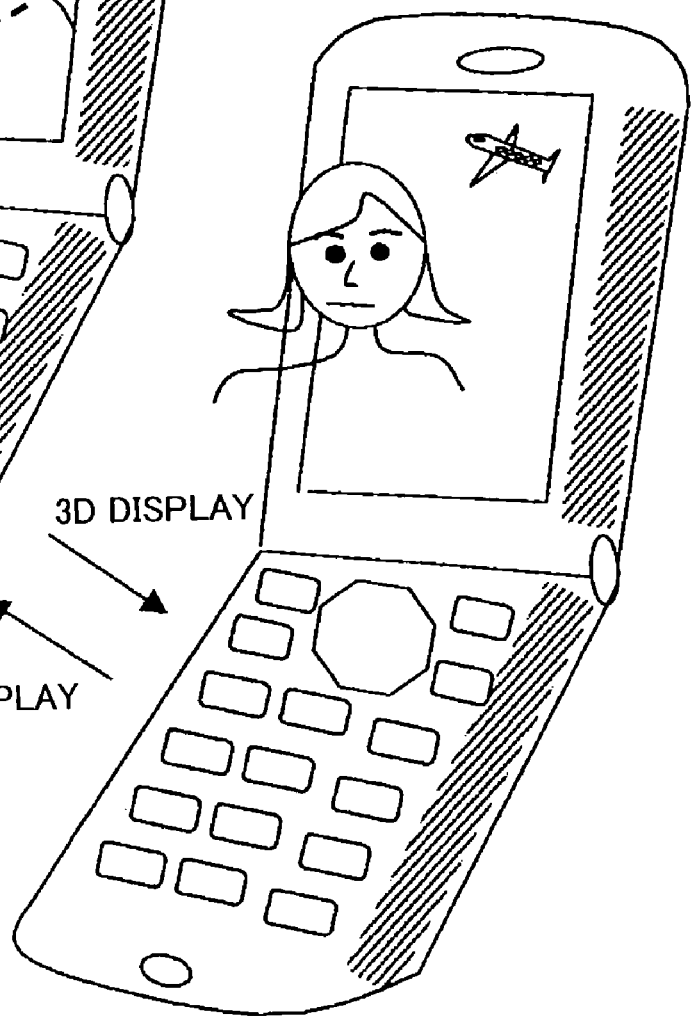

MOBILE EQUIPMENT WITH THREE DIMENSIONAL DISPLAY FUNCTION

BACKGROUND OF THE INVENTION

1. Field of the Invention

The present invention relates generally to mobile equipment and three dimensional (3D) conversion program products and particularly to mobile equipment and 3D conversion program products capable of readily providing a 3D display.

2. Description of the Background Art

In recent years, mobile equipment is increasingly miniaturized and enhanced in function. Furthermore, mobile terminals, mobile personal computers, mobile phones and other similar mobile equipment are provided with a function of a camera. For example, camera-equipped mobile phones have recently started to prevail. They are convenient as they can for example set a picked-up image on an idle screen and transmit a picked-up image on-site to the called.

Japanese Patent Laying-Open No. 10-108152 discloses a mobile information terminal which as part of enhancing mobile equipment in function utilizes parallax from both eyes to provide a stereoscopic display (a 3D display). Utilizing parallax from both eyes to provide a 3D display can add depth to a stereoscopic image displayed, providing a more realistic and lively image than a two dimensional image. As such, this technique is applied in the field of videophone. The mobile information terminal disclosed in Japanese Patent Laying-Open No. 10-108152 is a mobile information terminal of a type provided with two cameras and worn by a user on the arm. The mobile information terminal produces two video images provided with a temporal difference depending on a horizontal component of a subject's motion picked up through the two cameras and provides the images to the viewer's right and left eyes to implement a 3D display. Note that "a 3D display" means providing a stereoscopic display utilizing parallax.

The conventional mobile information terminal disclosed in Japanese Patent Laying-Open No. 10-108152, however, is not economical as the two cameras result in a higher price and an increased power consumption of the terminal.

Desirably, the two cameras picking up an image which is in turn three dimensionally displayed through parallax of human both eyes should be spaced by a distance corresponding to the parallax and in that arrangement pick up an image of a subject. If the distance between the two cameras is maintained while components other than the cameras are arranged, however, the arrangement of the other components is limited by that of the two cameras and the mobile information terminal's miniaturization and degree of freedom in design are impaired.

Furthermore, a moving subject that is picked up through the camera and displayed in a 3D image would in effect hardly provide a sufficient image. In addition, for a user normally using the camera to pick up a 2D image and, as required, pick up a 3D image and displaying the 3D image, only one of the two cameras would normally be used.

In other words, providing two cameras to provide a 3D display is accompanied by the aforementioned problems of higher price, increased power consumption, and impaired miniaturization and design, and it has been an obstacle to practical utilization of a 3D function in mobile equipment terminals. For mobile phones, in particular, there is a demand for reduction in size, weight, cost and the like, and it is difficult to provide mobile phones with two cameras.

SUMMARY OF THE INVENTION

Accordingly one object of the present invention is to provide mobile equipment that is reduced in size and power consumption and has a high degree of freedom in design.

The above object of the present invention is achieved by mobile equipment including the following components: a pickup device picking up an image of a subject; a three dimensional image creation portion providing the image with parallax information to create a three dimensional image; and a display unit displaying the three dimensional image.

In accordance with present invention in another aspect the mobile equipment includes: a single pickup device picking up an image of a subject; a three dimensional image creation portion providing the image with parallax information to create a three dimensional image; and a display unit displaying the three dimensional image.

In accordance with present invention in still another aspect a three dimensional conversion program product causes a computer to execute a three dimensional conversion process. It causes the computer to execute the steps of: inputting a two dimensional image; cutting a human face image out of the two dimensional image to obtain a face image; providing the face image with parallax information to create a three dimensional image; and outputting the three dimensional image.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIGS. 7A and 7B show a specific example of a screen displayed in accordance with a fourth embodiment on main screen 203 two dimensionally and three dimensionally, respectively.

DESCRIPTION OF THE PREFERRED EMBODIMENTS

First Embodiment

The present invention in a first embodiment will be described with reference to the drawings. While the present invention is applicable to any mobile equipment, hereinafter as a suitable embodiment a foldable, camera-equipped mobile phone will be described.

Figure 1:
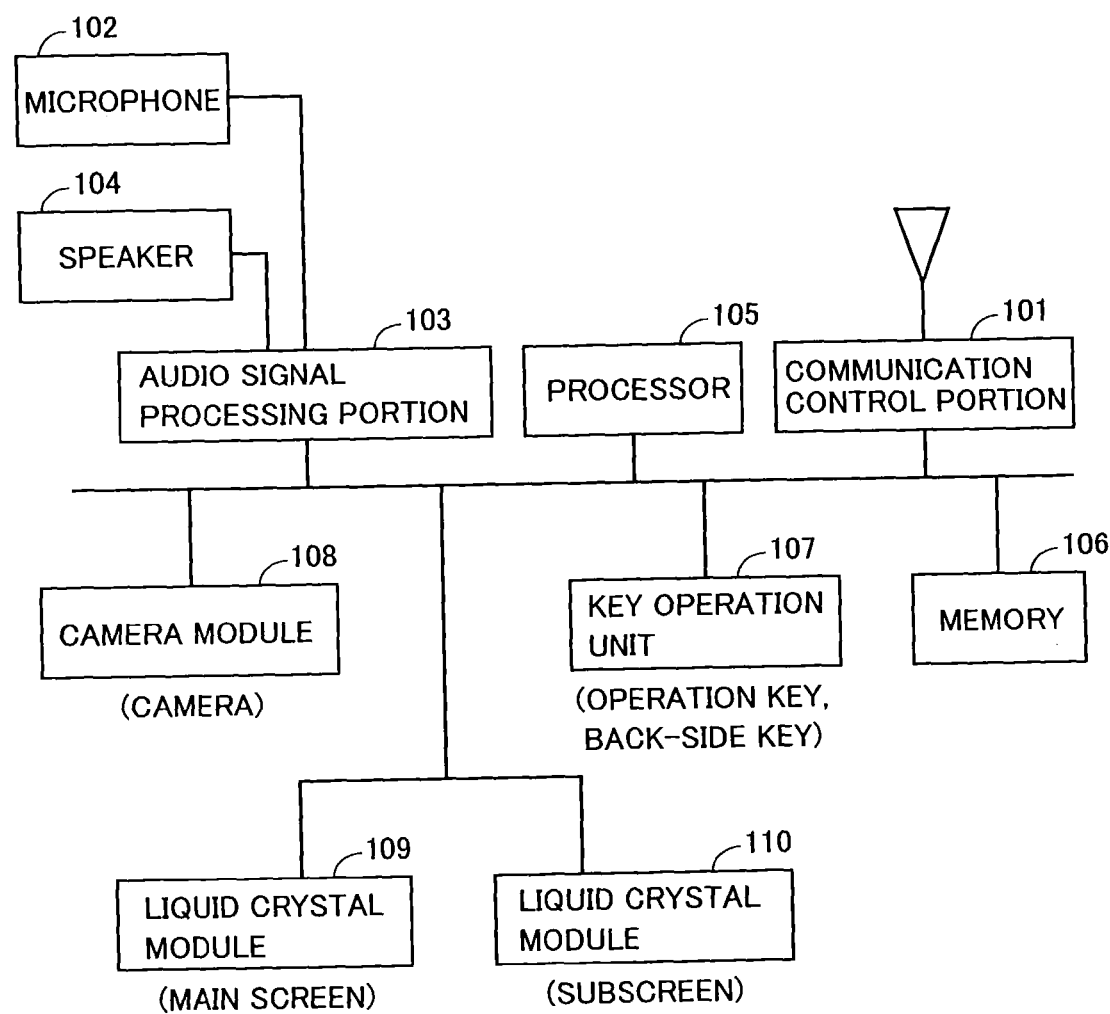
FIG. 1 is a block diagram showing a main configuration of a mobile phone in an embodiment.

FIG. 1 is a block diagram showing a main configuration of the mobile phone in the present embodiment. In the first embodiment the mobile equipment includes: a communication control portion 101 communicating with a base station (not shown); an audio signal processing portion 103 receiving an audio signal from a microphone 102 and encoding the signal and also decoding an audio signal received from a counterpart in the call of interest; a speaker 104 reproducing the decoded audio signal; a processor 105 executing a program to generally control the mobile phone; a memory 106 referenced by processor 105; a key operation unit 107 receiving an input from a user; a camera module 108 such as a CCD (charge coupled device) camera used for picking up a typical 2D image; a color liquid crystal module 109 for a main screen; and a color liquid crystal module 110 for a subscreen.

Figure 2A:
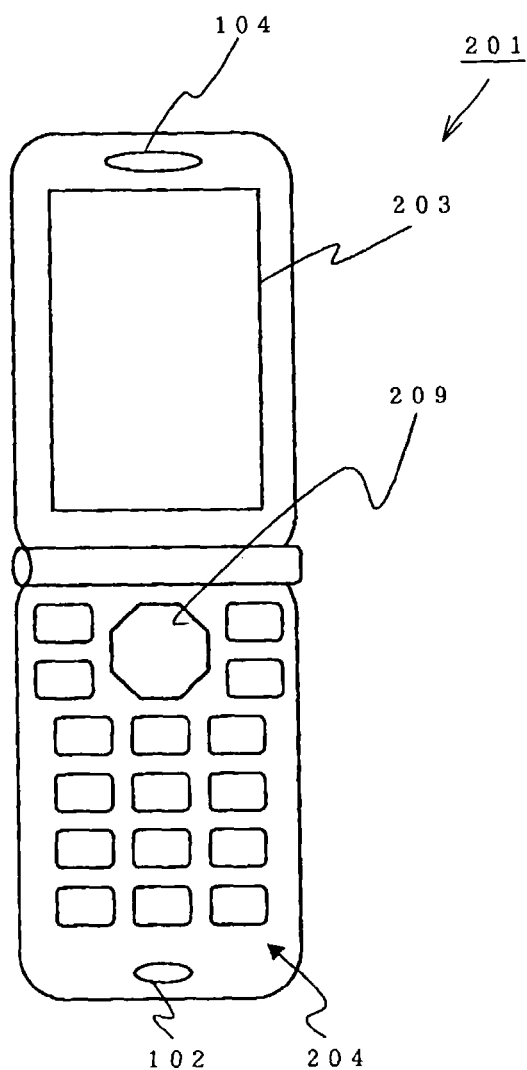
FIG. 2A is an overall view of a foldable mobile phone 201 flipped open, as seen at its internal side (or a key bearing side)
Figure 2B:
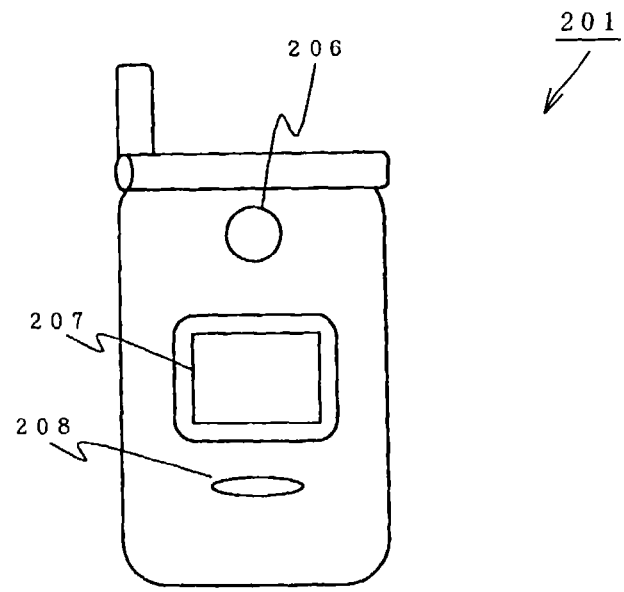
FIG. 2B is an overall view thereof closed, as seen at its external (back) side.

FIG. 2A is an overall view of foldable mobile phone 201 flipped open, as seen at its inner side (or a key bearing side), and FIG. 2B is an overall view thereof closed, as seen at the outer (back) side.

As shown in FIG. 2A, mobile phone 201 has speaker 104 arranged at the cover at an inner, upper center portion, and microphone 102 arranged at the body at an inner, lower center portion, which facilitate calls with mobile phone 201 open. Furthermore, operation keys 204 including numeral keys, a cross key 209 and the like are arranged at the body on an inner side and a main screen 203 is rectangular and arranged at the cover on the inner side so that with mobile phone 201 open they provide superior operability. Furthermore, a camera 206 is arranged at the cover on the outer side close to the hinge in the vicinity of the center and a subscreen 207 is rectangular and arranged at the cover on the outer side in the vicinity of the center so that even with mobile phone 201 closed the user can confirm a subject on subscreen 207 in picking up an image through camera 206. Furthermore, a back-side key 208 is arranged under subscreen 207 so that it can be used as a shutter key with mobile phone 201 closed. While FIG. 2B shows only a single key 208, providing a plurality of keys 208 allows them to be used differently as keys operated to switch information displayed on subscreen 207 (e.g., a scroll key, a key operated to select an image accumulated, and the like). If the user picks up an image of a subject with mobile phone 201 open, the user confirms the subject on main screen 203 or subscreen 207, while the user uses any of operation keys 204 as a shutter key to pick up an image.

Main screen 203 is configured of a liquid crystal module capable of a stereoscopic display (hereinafter referred to as a 3D display). Alternatively, both or one of main screen 203 and subscreen 207 may be formed of a liquid crystal module capable of a 3D display. Allowing subscreen 207 to display a favorite 3D image as an idle screen enables the user to constantly see the 3D image without opening mobile phone 201, which adds value to the mobile phone.

Figure 3:
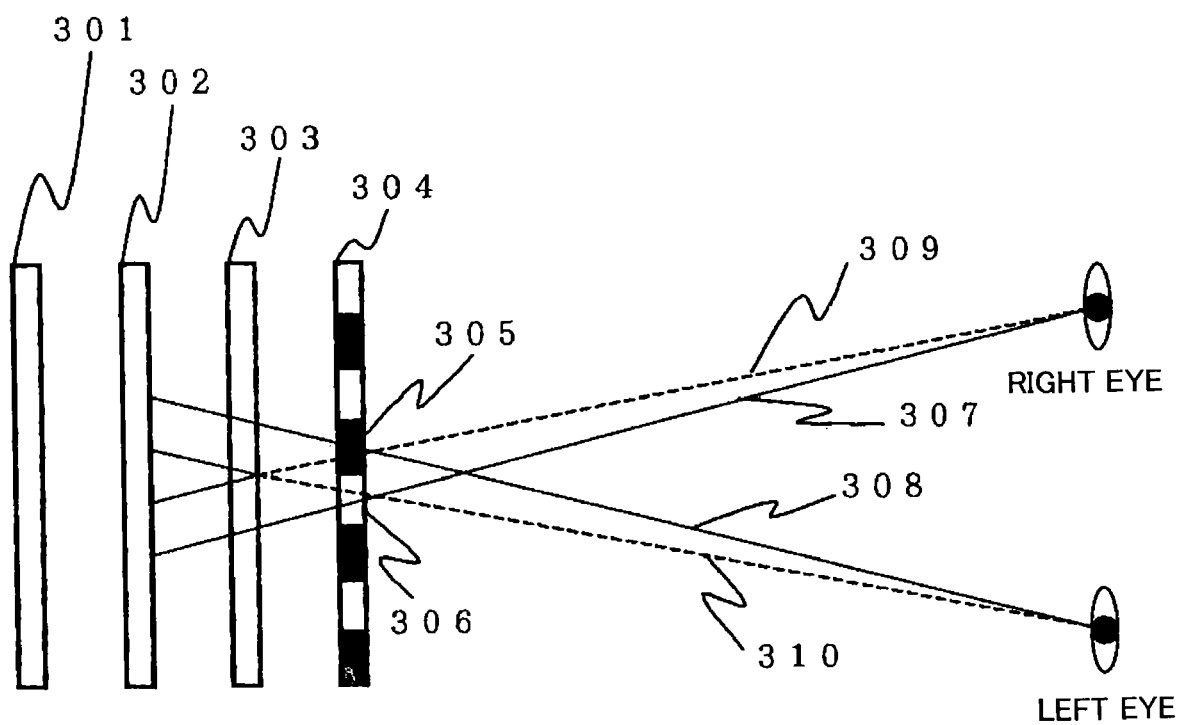
FIG. 3 is a plan cross section of a configuration of a main portion of a liquid crystal module capable of providing a 3D display that is used for a main screen 203.

FIG. 3 is a plan cross section of a configuration of a main portion of a liquid crystal module capable of a 3D display that is used for main screen 203. With reference to FIG. 3, the liquid crystal module includes a back light 301, a switching liquid crystal element 302 switchable in deflection angle, a patterned phase difference plate 303 patterned in a slit, and a thin film transistor (TFT) liquid crystal 304.

To display a 3D image on main screen 203, the liquid crystal element 302 deflection angle is switched to change a relationship of the liquid crystal element 302 phase and the phase difference plate 303 phase to interrupt an image for the left eye to prevent the image from passing through an L pixel 306 (displayed by a white pixel in the figure) and being projected on the right eye (a broken line 309). Likewise, an image for the right eye is interrupted so that the image is prevented from passing through an R pixel 305 (displayed by a black pixel in the figure) and being projected on the left eye (a broken line 310).

Thus on the viewer's right eye the image for the right eye alone is projected and on his/her left eye the image for the left eye alone is projected. This provides the viewer's right and left eyes with different images and as a result the viewer can perceive a three dimensional, stereoscopic image (a 3D image) providing a sense of depth.

Furthermore, if a main screen 203 displays a 2D image (a normal, two dimensional planar image), the above-described optical interruption by liquid crystal 302 and phase difference plate 303 is not provided. Electrically controlling liquid crystal 302 and phase difference plate 303, as described above, allows main screen 203 to display a 2D image and a 3D image, as switched. 2D and 3D images can simply be switched for example by lightly pressing any operation key 204, such as a power supply key.

Note that while in the present invention a liquid crystal module configured as described above is used to provide a 3D display on main screen 203, a configuration using a lenticular lens, a configuration using continuous grain silicon liquid crystal rather than TFT liquid crystal 304 or a similar configuration may be used to do so. Furthermore, while the above described configuration employs for main screen 203 a liquid crystal module capable of a 3D display, a typical liquid crystal module allowing main screen 203 to display a 2D image may be used and the display may be observed through polarization glasses. In that case, a configuration combining together the liquid crystal module allowing a 2D image to be displayed and the polarization glasses provides a display means capable of a 3D display.

Hereinafter will be described a procedure of a process using the thus-configured mobile phone to pick up a 2D image through camera 206, create a 3D image therefrom and finally display the 3D image on main screen 203.

Figure 4:
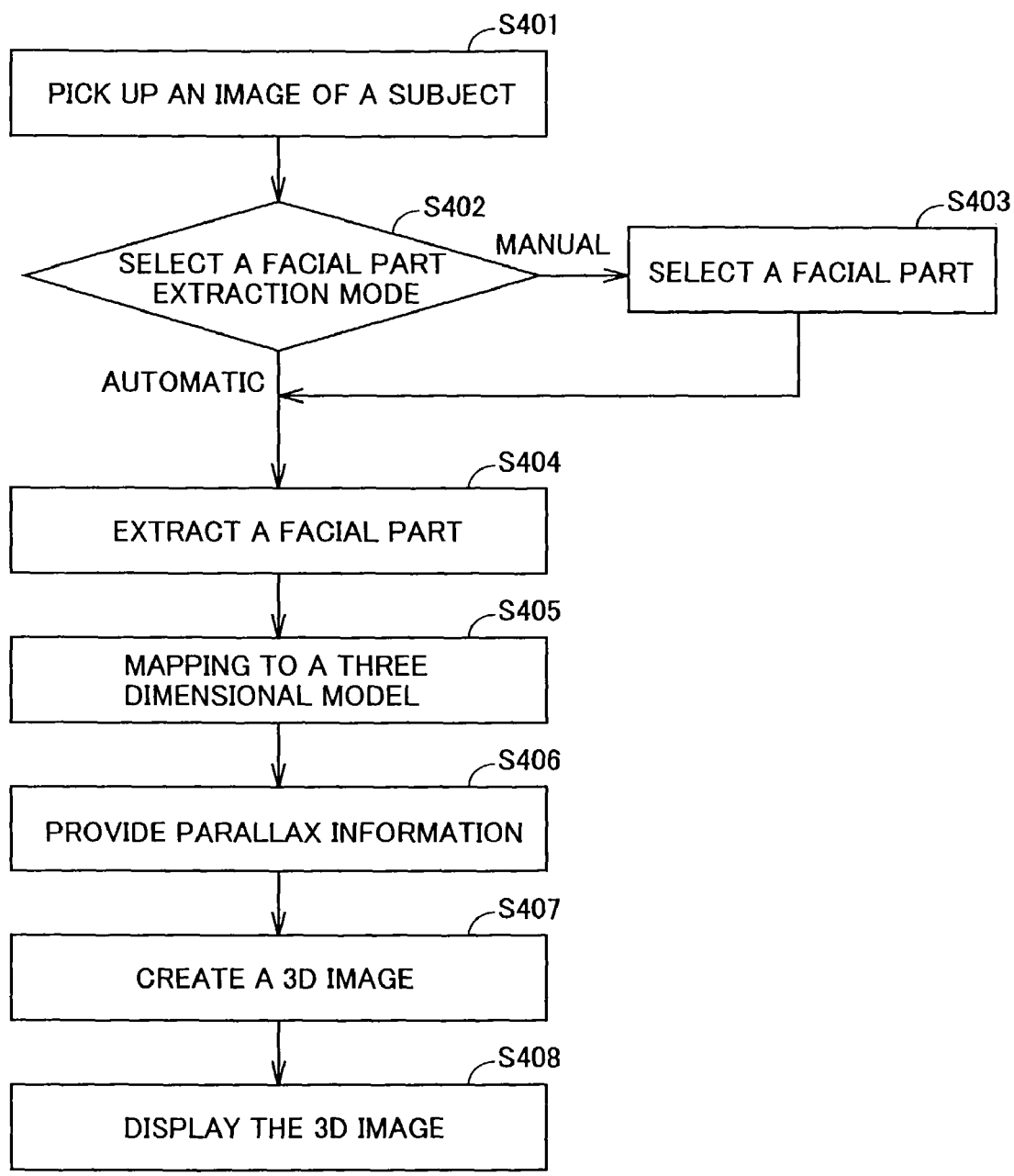
FIG. 4 is a flow chart representing a process performed in the mobile phone to pick up and three dimensionally display an image of the face of a person.
Figure 5:
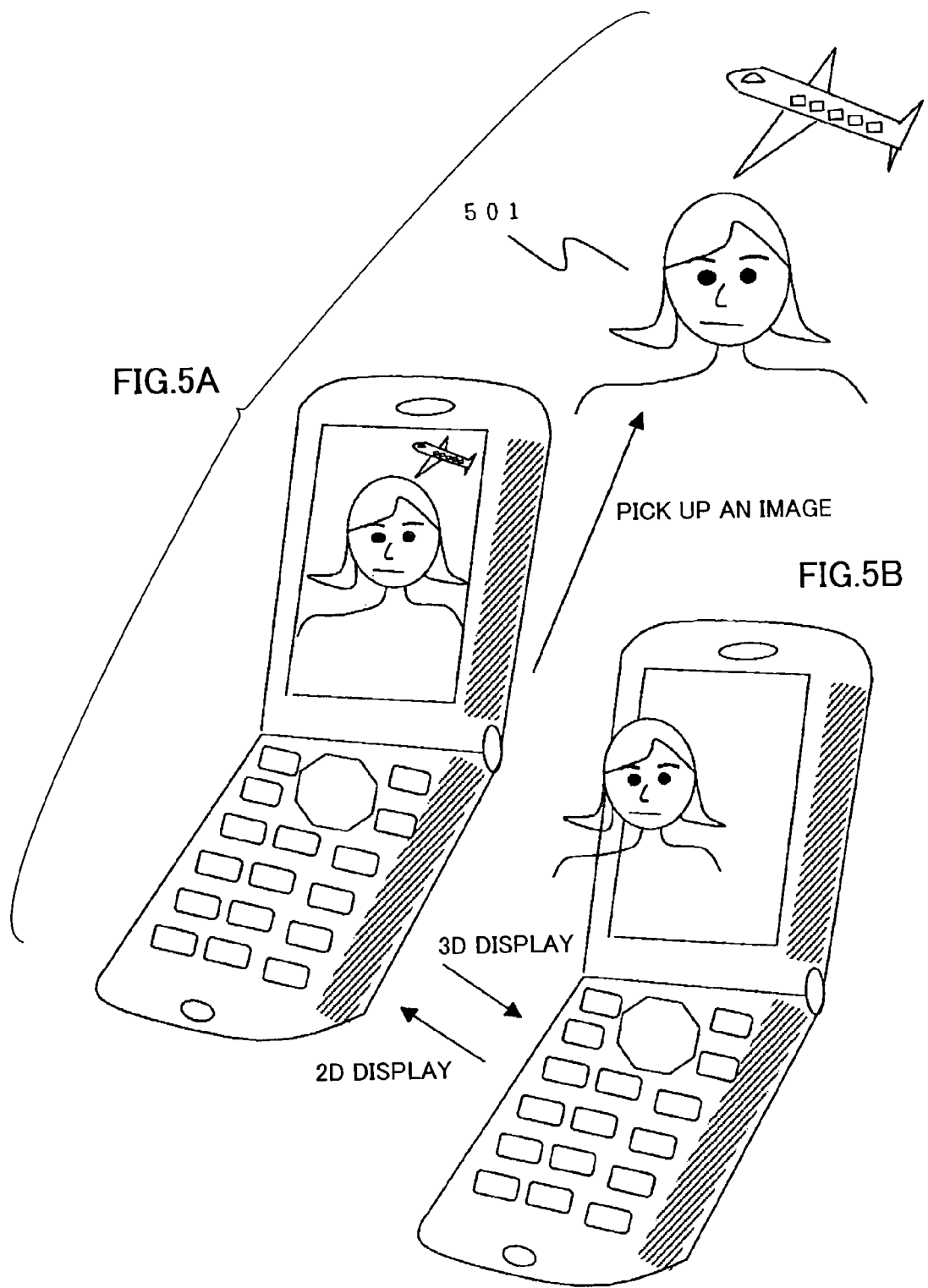
FIGS. 5A and 5B show a specific example of a screen displayed in accordance with a first embodiment on main screen 203 two dimensionally and three dimensionally, respectively.
Figure 6:
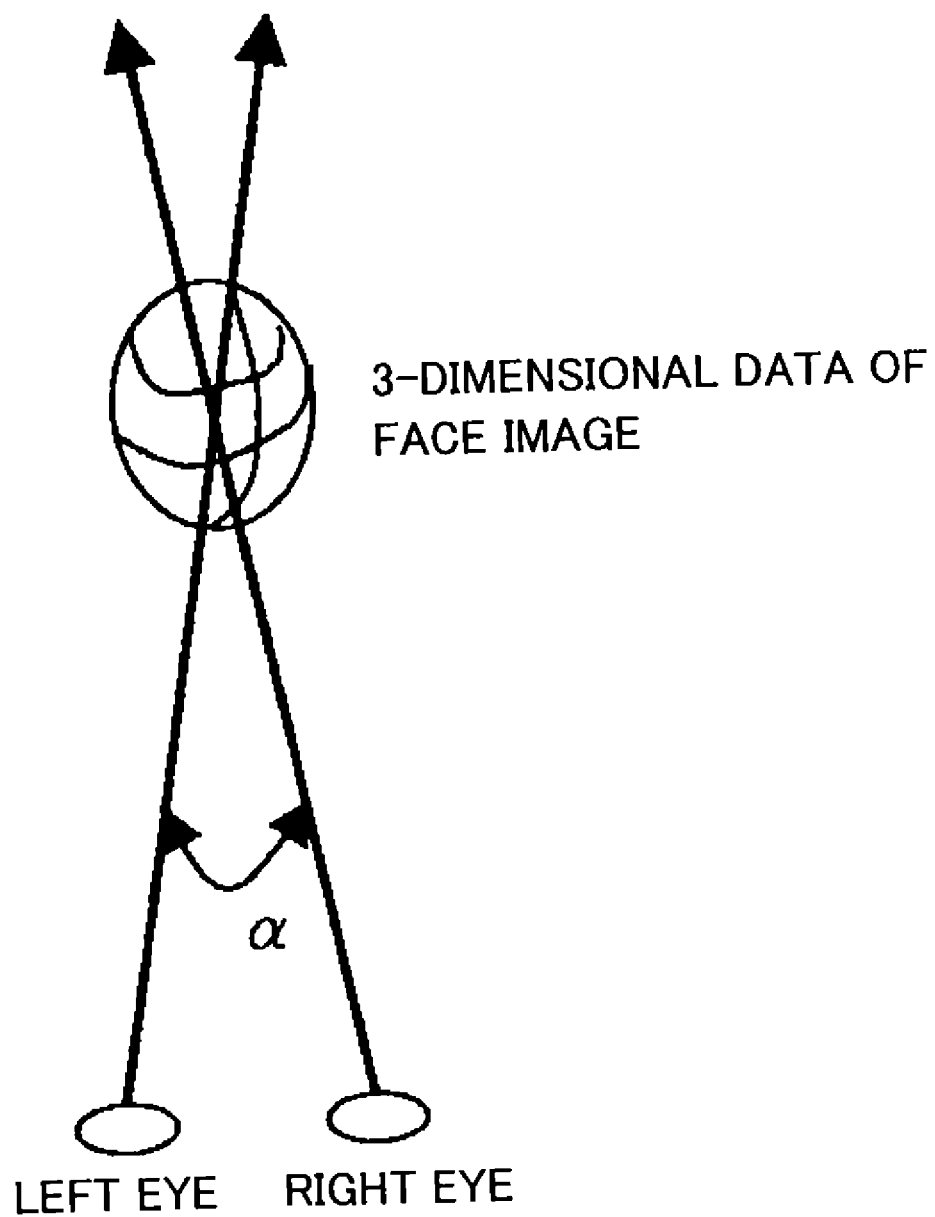
FIG. 6 represents a concept for illustrating how to obtain parallax information in the first embodiment.

By way of example, an image of the face of a person is picked up and three dimensionally displayed, as will be described hereinafter with reference to the flow chart shown in FIG. 4, an example of a screen displayed as shown in FIGS. 5A and 5B, and the diagram shown in FIG. 6 representing a concept in obtaining parallax information.

With reference to FIG. 4, and FIG. 5A, a user confirms on main screen 203 the face of a person as a subject 501, seen via a camera. When a desired image is displayed on main screen 203, the user presses operation key 204 that serves as a shutter key to pick up an image of subject 501. Camera module 108 takes in the image in the form of a 2D image (a still picture) (S401).

Then by processor 105 a mode of whether facial parts such as eyes, nose, mouth, eyebrows, jaw and the like and the face's contour are extracted from the taken 2D image automatically or manually is confirmed (S402). This face image extraction mode may be set by the user previously for example via a menu screen of the mobile phone, or it may be set by the user whenever he/she operates the mobile phone. If the face image extraction mode is the manual extraction mode ("manual" at S402), processor 105 receives from the user via operation key 204 a designation of a position of each facial part as described above (S403). Then processor 105 uses positional information designated at step S403 to obtain a two dimensional coordinate of each facial part (S404). In doing so, allowing a pen a mouse, a jog dial or the like (not shown) to be used for input to provide selectableness provides enhanced operability. Note that when a face's 2D image is used to create a 3D image, the nose protrudes most stereoscopically. Accordingly, whether the face image extraction mode is the automatic extraction mode or the manual extraction mode, the nose is set as a facial part to be always extracted. In particular, if human perception is considered, emphasizing the protrusion of the nose can provide the face with a sense of depth.

If the face image extraction mode is the automatic extraction mode ("automatic" at S402), processor 105 employs a well known facial part extraction technique for example utilizing edge detection to obtain a two dimensional coordinate of each facial part from the 2D image taken at step S401 (S404). For mobile phones or similar equipment inconvenient for the user to perform an input operation, it is convenient that facial parts are automatically extracted. Furthermore, in picking up an image, displaying a round, square or similar frame on main screen 109 and allowing the user to pick up the image with a face image positioned in a vicinity of the frame allows processor 105 to extract facial parts in a narrowed range so that for the automatic extraction process can be performed rapidly with high precision.

At step S404 each facial part's two dimensional coordinate is obtained and when a face image is cut out of the 2D image taken in at step S401 processor 105 then projects the extracted, each facial part's coordinate on a predetermined, three dimensional human face model to obtain three dimensional data of the entirety of the face image (S405). At step S405 the three dimensional model generation method previously filed by the applicant and disclosed in Japanese Patent Laying-Open No.2001-109907 is used, as described hereinafter.

Processor 105 estimates (detects) the size, position and direction of the face from each facial part's two dimensional coordinate obtained at step S404 and projects a standard face geometry model, which is based on a standard human face geometry corresponding to a three dimensional, human face model, in the estimated size, position and direction on the 2D image taken in at step S401. Processor 105 then calculates a positional offset between a coordinate of each facial part included in the standard face geometry model that is projected on the 2D image and each facial part's two dimensional coordinate obtained at step S404. Processor 105 then projects the model in a position and direction slightly offset from the provisionally estimated size, position and direction and similarly calculates a positional offset between a coordinate of each facial part included in the model that is projected and each facial part's two dimensional coordinate obtained at step S404. Processor 105 thus obtains a size, position and direction providing a minimal offset between the coordinates and uses it as a subsequent, provisional estimated size, position and direction in repeating the above described process. Processor 105 repeats such a process and finally when the offset is no longer reduced processor 105 estimates the current size, position and direction as a final size, position and direction of a face image included in the 2D image.

Processor 105 then projects on the 2D image taken at step S401 standard face geometry data in the thus-estimated size, position and direction to generate a texture image. More specifically, processor 105 initially calculates coordinates of all apexes, respectively, of the standard face geometry data. Simultaneously, processor 105 provides a parallel projection of the standard face geometry data on the texture image in a predetermined size and position at a front side and calculates coordinates of all apexes, respectively, of the standard face geometry data. More specifically, a coordinate of an apex projected on the 2D image is assumed to correspond to that of the same apex projected on the texture image, and based on this correspondence an image conversion technique is employed to transfer each facial image from the 2D image onto the texture image. The image conversion technique used herein is a well known technique in the field of image processing and it can be readily implemented by those skilled in the art. As such, the image conversion technique will not be described in detail herein.

The transfer provides an image approximate to an image of a subject included in the 2D image that is picked up at a front side to have a predetermined size and position. Processor 105 generates a three dimensional model corresponding to such an approximate image at step S405 as a texture image pasted on standard face geometry data at a front side by parallel projection.

Note that at step S405, as has been described above, as a three dimensional, human face model a standard face geometry model based on a standard human face geometry may be used. Alternatively, a plurality of face geometry models such as a round face, a thin face and the like may previously be prepared to allow a user to select a model. Furthermore, a dedicated face geometry model for a particular person can previously be stored in memory 106 and at step S401 an image of the person can be picked up and at step S405 the face geometry model dedicated to the person can be used to generate a more precise 3D image. For example, if a face geometry model of the owner of the mobile phone is stored in memory 106, the owner's more precise 3D face image data can be readily generated. The mobile phone shown in FIGS. 2A and 2B allows the user to take his/her picture with the phone closed while on subscreen 207 the user can confirm his/her face. The user can readily pick up his/her face image. If a plurality of people exchange their respectively produced 3D face images by means for example of attaching the images to mail, the high precision 3D face images can be enjoyed among more than one person. Note that a person's dedicated face geometry model is calculated through a large quantity of calculation and a result of calculation by a server may be downloaded to the mobile phone.

At step S405 a face image's three dimensional data is obtained. Processor 105 then provides the three dimensional data with parallax information (S406). At step S406 processor 105 performs an approximate calculation based on a standard distance between human both eyes (e.g., approximately 6 cm) and a typical distance selected when a mobile phone is used to take a picture of a human face (e.g., approximately 1 m), obtains an angle α formed by a line extending between the subject's face and one eye assumed at the position of the camera and a line extending between the subject's face and the other eye assumed at the position of the camera, and imparts to three dimensional data the parallax information corresponding to angle α. More specifically, as shown in FIG. 6, processor 105 provides as image data for the right eye the data obtained through projection from the right eye's provisionally assumed position onto a face image's three dimensional data and conversion and as image data for the left eye the data obtained through projection from the left eye's provisionally assumed position onto the face image's three dimensional data and conversion. Processor 105 thus creates a 3D image including an image for the right eye and that for the left eye (S407).

Processor 105 then displays the 3D image on main screen 203. The viewer visually perceives a human face projected out of main screen 203, as shown in FIG. 5B (S408).

Note that although in FIG. 5B, because of drawing technique, the nose's height, the eyes' recess on other similar sense of depth are not represented, the viewer can perceive such depth and enjoy a more realistic face image. Furthermore in FIG. 5B the person's neck, shoulders and therearound are also displayed similarly as shown in FIG. 5A. Thus the present mobile phone may be adapted to also cut out a portion of a person other than the face or put clothes or the like previously prepared as a template on a person like a dress-up doll and display the same.

While in the above example processor 105 calculates parallax information with a distance from camera 206 to subject 501 as a predetermined distance (for example of 1 m), the user may input a distance via operation key 204 whenever the user take a picture. If the user take a picture of his/herself, the user often reaches out his/her arm holding the mobile phone to take his/her picture. As such, the user taking his/her picture is closer (e.g., 50 cm) to the mobile phone than the face of a person other than the user. Accordingly, when the user takes his/her picture, processor 105 may be adapted to automatically switch a predetermined distance in calculating parallax information. Note that processor 105 can automatically determine whether a picture of the user's face or that of a person other than the user is to be taken for example by detecting whether the cover is open or closed.

Furthermore while in the above example the face of a person is cut out of a picked-up 2D image and displayed three dimensionally, a background image (e.g., a plane shown in FIG. 5A) excluding a human face may be displayed together with the face. A human face and a background image that are displayed together provide a further increased sense of depth and hence a more lively image.

Furthermore while the above example has been described in conjunction with a three dimensional human face model, for example a Pomeranian or any other similar dog's three dimensional face model may be prepared to allow the user to create his/her pet's 3D image or a three dimensional human body model may be prepared and used to create a 3D image of a human entire body.

In the above example after an image of a subject is picked up main screen 203 displays a 2D image as shown in FIG. 5A. Alternatively, operation key 204 may previously include a 3D shutter button and if the above described 3D conversion process is adapted to be automatically performed then after the 3D shutter button is pressed a 3D image as shown in FIG. 5B can immediately be displayed.

Second Embodiment

If a "PLAY3DPC" product kit available from I-O DEVICE, INC. is used, an image picked up through a digital camera can be taken into a personal computer (PC) and the image's each block can be analyzed in brightness by dedicated software. A brighter block is assumed to be positioned forward in creating a 3D image. The user then displays the created 3D image on a display connected to the PC and via liquid crystal glasses views the 3D image.

The technique utilizing an image's brightness to create a 3D image can be used to allow processor 105 of the mobile phone in the second embodiment to divide a 2D image picked up through camera 206 into a plurality of blocks and detect each block's brightness, and provide parallax information for each block to allow a brighter block to have a more forward position to create and display a 3D image on main screen 203. For example, a perspective background image including an automobile positioned forward and a building backward can be displayed.

In this case, processor 105 is driven by an intensity in brightness of each block of the 2D image to provide different parallax information for each block to create a 3D image. As such, an approximate calculation for calculating parallax information, as described in the first embodiment, is not required.

Third Embodiment

Figure 8:
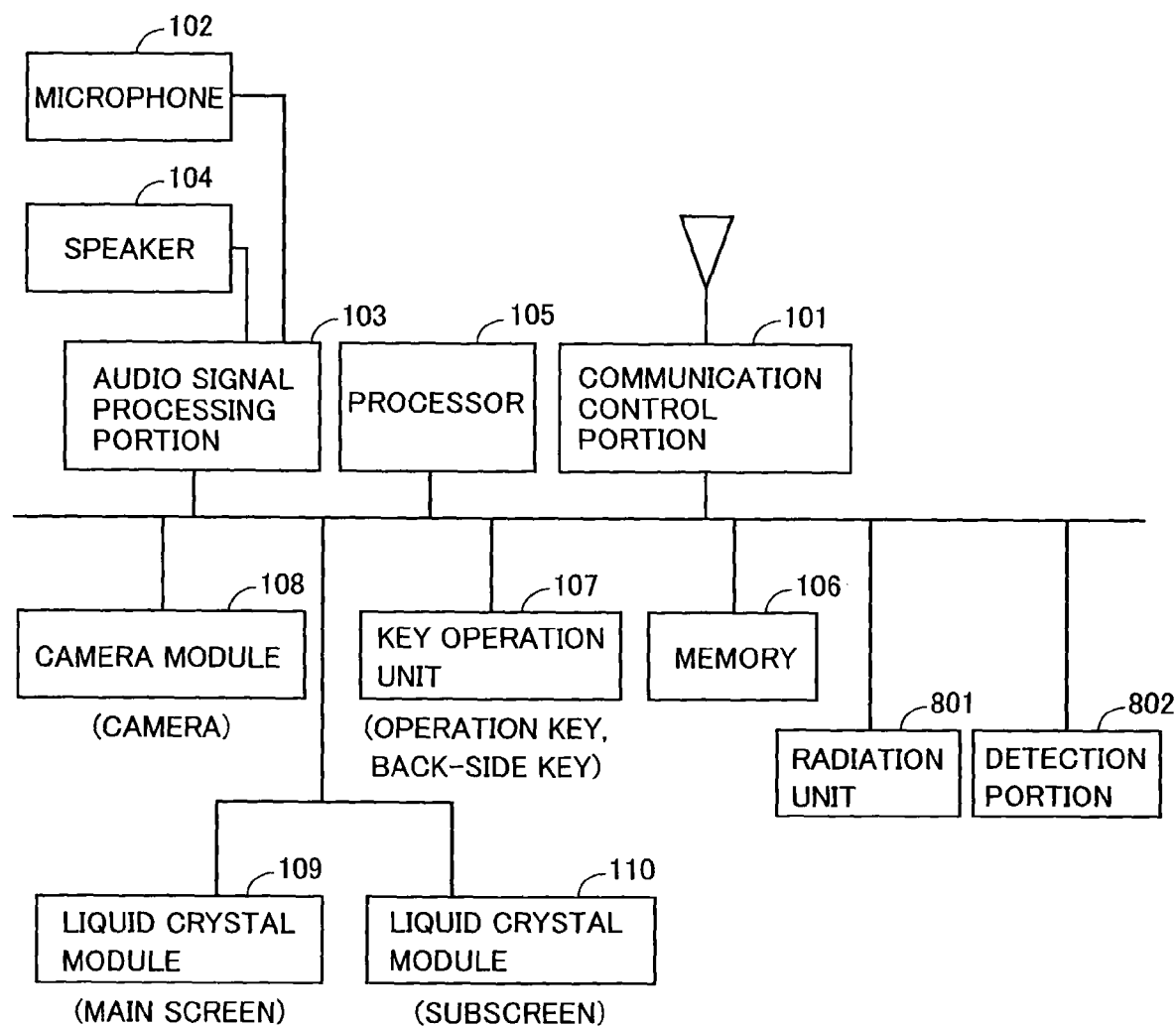
FIG. 8 is a block diagram showing a configuration of a main portion of the mobile phone in a third embodiment.

Japanese Patent Laying-Open No. 2002-77944 discloses a technique, which can be used to illuminate a subject with light and detect from intensity of a reflection of the light a distance from the mobile phone to each portion of the subject, and be driven by the distance information to provide the subject's each portion with different parallax to create a 3D image. The created 3D image can be displayed on externally connected, stereoscopic video image display device. More specifically, in the mobile phone of the third embodiment the technique disclosed in Japanese Patent Laying-Open No. 2002-77944 can be adopted to allow processor 105 to be driven by a distance to a subject of a 2D image picked up through camera 206 to provide each portion of the subject with different parallax information to create a 3D image and display the image on main screen 203. In this example the mobile phone in the third embodiment includes the components shown in FIG. 1 plus a radiation unit 801 illuminating a subject with light and a detection portion 802 detecting the intensity of a reflection of the light, as shown in FIG. 8.

Fourth Embodiment

In a fourth embodiment the mobile phone may include processor 105 accepting in response to a user's selection via operation key 204 (e.g., cross key 209) a subject in a 2D image picked up through camera 206 and displayed on main screen 203 that is located forward, and providing the selected subject with parallax information different than a background image other than the selected subject to create a 3D image.

For example, as shown in FIG. 7A, the user uses a selection frame 701 displayed on main screen 203 to designate in a 2D image of a human face and a plane the human face, located forward, via operation key 204 (e.g., cross key 209). Selection frame 701 may be displayed in the form of a circle or a square. Furthermore, allowing the frame to be variable in size can help to designate a subject accurately. Furthermore, rather than using selection frame 701 surrounding a subject, using a pen (not shown) for input to tracing and thus designating a subject to be cut out allows the subject to be cut out more accurately.

Processor 105 having accepted the selection then uses edge detection or a similar image processing technique to cut the selected subject out of the 2D image and provides parallax for the cut-out subject's image to allow the subject to be seen more forward than a background image other than the subject to create a 3D image. Although in FIG. 7A the hair and the shoulders have a portion outside selection frame 701, processor 105 preferably also estimates edge continuity for a portion more or less outside the frame to cut out the portion.

When in a vicinity of selection frame 701 the subject's image is cut out and a 3D image is created, as shown in FIG. 7B, the user perceives the subject's face in front of the plane.

In the above described process, the three dimensional model described in the first embodiment is not used and the nose's height and other similar sense of depth of the face is not represented, whereas in the fourth embodiment processor 105 does not perform a process related to a three dimensional model and it can readily create a 3D image. Note that in this case a subject is not limited to a human face and may for example be a building.

Furthermore while in the above example after a picture has been taken selection frame 701 is used to select a subject to be seen forward. Alternatively, when a picture is to be taken selection frame 701 may be displayed and the picture may be taken with a front subject positioned in a vicinity of selection frame 701. This can eliminate the necessity of an operation designating selection frame 701 after a picture has been taken. Simply pressing a shutter key can display a 3D image.

Furthermore while in the above example only a single subject is selected, a plurality of subjects may be selected, successively from a front subject. In that case, processor 105 provides each selected subject with different parallax information. Thus selecting a plurality of subjects and three dimensionally displaying the subjects can add further depth and hence realism.

As has been described in each embodiment, camera 206 in the present embodiment for taking a picture of a subject may be a camera used for picking up a typical 2D image and it is not required to have a specific function for 3D image. As such it is not necessary to prepare a camera for picking up a 3D image and a camera used in a conventional mobile phone can exactly be used. More specifically in accordance with the present invention a 2D image picked up through a camera provided in mobile equipment can be displayed by the equipment three dimensionally. Since a single camera is sufficient, the mobile phone can be miniaturized and provide reduced power consumption. Furthermore, a significantly more degree of freedom in design for arranging components can be provided than when two cameras for picking up 2D and 3D images are used.

Furthermore in the above each embodiment the process up to creating a 3D image from a 2D image is entirely or partially performed by processor 105 reading software. Processor 105 may read a 3D conversion program previously stored in memory 106 and incorporated in a mobile phone, or downloaded and thus obtained from a server. Furthermore the 3D conversion program may be used in a personal computer or other similar equipment other than mobile phones.

Furthermore in the present mobile equipment the process described in each above embodiment may have its entirety or a portion combined with each other for execution. For example in the mobile equipment the process in the first embodiment for creating a 3D image from a three dimensional model and the process in the second embodiment for obtaining parallax information based on intensity in brightness of an image may be combined together for execution. A more realistic 3D image of a face together with a perspective background image can be displayed.

Note that while the above mobile phone has been described as being foldable, it may be of a linear type.

Furthermore while in the above description the mobile phone has been described as taking a still picture by way of example, it may be adapted to allow an animated picture to be taken. This can be achieved simply by performing consecutively for a plurality of images forming the animated picture a process similar to that performed for a still picture.

Fifth Embodiment

In converting into a 3D image a 2D still image for example of a user's face picked up through a digital camera, commercially available software such as the "PLACE 3 DPC" product kit manufactured by I-O DATA DEVICE, INC. described in the first embodiment allows a PC having mounted the software to take in the 2D still image and process the image. However, it is also possible to convert the 2D image to a 3D image immediately by using software dedicated to 3D conversion that is provided in the body of the mobile phone in the fifth embodiment. In the fifth embodiment the mobile phone allows a 2D image to be converted to a 3D image, although pseudo in that an image for both eyes is not an actually picked-up image, and the 3D image to be three dimensionally displayed via commercially available software incorporated therein to provide conversion from a 2D image to a 3D image, as described above.

Sixth Embodiment

While in the above embodiments a 2D image obtained by the mobile phone through a camera is converted to a 3D image, a 2D image (a photograph, animation or the like) transmitted via a communication means can be received at communication control portion 101 and subjected to a process similar to that for a picked-up image, as described above, to provide a 3D image and display the image three dimensionally. This can be achieved simply by setting one operation key as a 3D image creation designating key.

Thus the present mobile equipment can three dimensionally display a 2D image picked up through a camera provided in the mobile equipment.

Furthermore in accordance with the present invention a camera equipped mobile phone can be used to take a picture of a subject and the picture can be displayed three dimensionally on site immediately. A mobile phone is equipment always carried by the user and without letting a chance to take a picture slip away the picture can be taken and the image can three dimensionally be displayed. A 3D display is more realistic than a 2D display and the obtained image can be more enjoyable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Mobile equipment comprising:
a single pickup device picking up an image of a subject;
a parallax imformation portion determining parallax information of said subject based on a distance between human eyes;
a three dimensional image creation portion creating a three dimensional image by applying said parallax information to said image; and
a display unit displaying said three dimensional image,
wherein said three dimensional image creation portion cuts a human face out of said image picked up, to obtain a face image and provides said face image with said parallax information, further comprising
a memory for storing a face geometry model, wherein said three dimensional image creation portion generates three dimensional data from the human face based on the face geometry model, and converts the three dimensional data into the three dimensional image.

2. The mobile equipment of claim 1, wherein said pickup device is a pickup device for picking up a two dimensional image.

3. The mobile equipment of claim 2, further comprising:
a communication control portion controlling a communication with another device; and
a transmission and reception portion allowing a call to and from another device.

4. Mobile equipment comprising:
a single pickup device picking up an image of a subject;
a parallax information portion determining parallax information of said subject based on a distance between human eyes;
a three dimensional image creation portion creating a three dimensional image by applying said parallax information to said image; and
a display unit displaying said three dimensional image,
wherein said three dimensional image creation portion selects a particular subject from said image picked up, to obtain an image of the subject and provides said image of the subject and an image included in said image picked up other than said particular subject with different parallax information, repectively, further comprising
a memory for storing a face geometry model, wherein said three dimensional image creation portion generates three dimensional data from the selected subject based on the face geometry model, and converts the three dimensional data into the three dimensional image.

5. The mobile equipment of claim 4, wherein said pickup device is a pickup device for picking up a two dimensional image.

6. The mobile equipment of claim 5, further comprising:
a communication control portion controlling a communication with another device; and
a transmission and reception portion allowing a call to and from another device.

7. A three dimensional conversion program product stored on a non-transitory computer readable storage medium causing a computer to execute a three dimensional conversion process comprising the steps of:
inputting a two dimensional image;
cutting a human face image out of said two dimensional image to obtain a face image;
determining parallax information of said face image based on a distance between human eyes;
creating a three dimensional image by applying said parallax information to said face image; and
outputting said three dimensional image, further comprising
a memory for storing a face geometry model, wherein the step of creating a three dimensional image further comprises generating three dimensional data from the human face image based on the face geometry model, and converting the three dimensional data into the three dimensional image.

8. Mobile equipment comprising:
a pickup device picking up an image of a subject;
a parallax informatin portion determining parallax information of said subject;
a three dimensional image creation portion creating a three dimensional image by applying said parallax informatin to said image; and
a display unit displaying said three dimensional image,
wherein said parallax information portion calculates said parallax inforation based on differences in the brightness between parts of the image.

9. Mobile equipment comprising:
a pickup device picking up an image of a subject;
a parallax information portion determining parallax information of said subject;
a three dimensional image creation portion creating a three dimensional image by applying said parallax information to said image; and
a display unit displaying said three dimensional image,
wherein said parallax information portion calculates said parallax information based on the intensity of light reflected from the subject and on a distance between human eyes, further comprising
a memory for storing a face geometry model, wherein said three dimensional image creation portion generates three dimensional data from the image of the subject based on the face geometry model, and converts the three dimensional data into the three dimensional image.

10. Mobile equipment comprising:
a pickup device picking up a two dimensional image data of a subject;
a three dimensional image creation portion obtaining display data for three dimensional display, the display data including image data for a right eye and for a left eye, wherein said three dimensional image creation portion includes,
a first data process means for generating three dimensional data derived from the two dimensional data; and
a second data process means for converting the three dimensional data into the image data for the right eye and the image data for the left eye; and
a display unit displaying an image for the three dimensional display based on the display data.

11. The mobile equipment of claim 10, wherein said display unit includes a switching liquid crystal element switchable in deflection angle, and a patterned phase difference plate patterned in a slit;
said mobile equipment further comprising a controlling portion to change a relationship of said liquid crystal element phase and said phase difference plate.

12. The mobile equipment of claim 11, wherein said display unit further includes a liquid crystal including a plurality of pixels and said controlling portion changes the relationship to prevent an image for the three dimensional display from passing through the pixels.

13. The mobile equipment of claim 11, further comprising operation keys receiving an input, wherein said controlling portion changes the relationship based on the input.

14. The mobile equipment of claim 10, wherein said pickup device is a single pickup device.

15. The mobile equipment of claim 10, further comprising
a communication control portion controlling a communication with another device; and
a transmission and reception portion allowing a call to and from another device.

16. The mobile equipment of claim 10, further comprising
a memory for storing a face geometry model, wherein said three dimensional image creation portion further includes an extraction means for extracting a human face image data out of the two dimensional image data, wherein said first data process means generates the three dimensional data from the human face image data based on the face geometry model.

17. The mobile equipment of claim 10, further comprising a three dimensional shutter button to pick up the two dimensional image data, wherein said three dimensional image creation portion obtains the display data in response to press of said three dimensional shutter button.

18. The mobile equipment of claim 10, further comprising a dividing portion for dividing the two dimensional image data picked up by said pickup device into a plurality of blocks; and a detecting portion for detecting the brightness of each of said plurality of blocks, wherein said three dimensional image creation portion generates the display data in response to the brightness of each of said plurality of blocks.

19. The mobile equipment of claim 10, further comprising a radiation unit illuminating the subject with light; and a detection portion detecting the intensity of the light, wherein said three dimensional image creation portion obtains the display data in response to the intensity of the light.

20. The mobile equipment of claim 10, further comprising operation keys for receiving an input for selection of a subject from the background in the two dimensional image displayed on said display unit, wherein said three dimensional image creation portion further includes a selection data process means for generating the two dimensional image data of the subject in response to the selection.

21. The mobile equipment of claim 20, wherein said operation keys receive inputs for the selection of a plurality of subjects and said selection data process means generates the two dimensional image data for each of the selected subjects.

22. A three dimensional conversion program product stored on a non-transitory computer readable storage medium causing a computer to execute a three dimensional conversion process comprising the steps of:

receiving an input of a two dimensional image data of a subject;

obtaining display data for three dimensional display, the display data including image data for a right eye and for a left eye, wherein said step of obtaining the display data includes the steps of:

generating three dimensional data derived from the two dimensional data; and converting the three dimensional data into the image data for the right eye and the image data for the left eye; and the process further comprising outputting the display data.

23. The mobile equipment of claim 8, wherein said parallax information of said subject is determined based on a distance between human eyes.

* * * * *